United States Patent
Wang et al.

(10) Patent No.: US 9,853,542 B2
(45) Date of Patent: Dec. 26, 2017

(54) CONSTANT-VOLTAGE AND CONSTANT-CURRENT BUCK CONVERTER AND CONTROL CIRCUIT

(71) Applicant: BCD SEMICONDUCTOR MANUFACTURING CO., LTD., George Town, Grand Cayman (KY)

(72) Inventors: Hu Wang, Shanghai (CN); Yajiang Zhu, Shanghai (CN); Ruixia Fei, Shanghai (CN); Shuzhuang Lv, Shanghai (CN)

(73) Assignee: BCD SEMICONDUCTOR MANUFACTURING LIMITED, Shanghai (CN)

( * ) Notice: Subject to any disclaimer, the term of this patent is extended or adjusted under 35 U.S.C. 154(b) by 0 days.

(21) Appl. No.: 15/019,773

(22) Filed: Feb. 9, 2016

(65) Prior Publication Data

US 2016/0164408 A1 Jun. 9, 2016

Related U.S. Application Data

(63) Continuation of application No. 14/033,341, filed on Sep. 20, 2013, now Pat. No. 9,356,508.

(30) Foreign Application Priority Data

Feb. 28, 2013 (CN) .......................... 2013 1 0064413

(51) Int. Cl.
*H02M 3/156* (2006.01)
*H02M 1/00* (2006.01)
(Continued)

(52) U.S. Cl.
CPC ............. *H02M 3/156* (2013.01); *H02M 1/08* (2013.01); *H02M 3/10* (2013.01); *H02M 7/2176* (2013.01);
(Continued)

(58) Field of Classification Search
CPC ................. H02M 3/156; H02M 3/158; H02M 2001/0009; H02M 2001/0022; H02M 3/10; H02M 1/08; H02M 7/2176
See application file for complete search history.

(56) References Cited

U.S. PATENT DOCUMENTS 6,069,804 A * 5/2000 Ingman ................. H02J 7/0068
363/124
2004/0135560 A1* 7/2004 Kernahan ............. H02M 3/157
323/282
(Continued)

*Primary Examiner* — Timothy J Dole
*Assistant Examiner* — Sisay G Tiku

(57) ABSTRACT

A control circuit is provided for a buck converter that includes at least an inductor coupled to an output of the buck converter. The control circuit includes a power switch configured for coupling to a line voltage and configured for charging the inductor, an input line voltage sampling circuit, and a constant-voltage (CV) and constant-current (CC) control module coupled to the power switch. During a charging period of the inductor, the CV and CC control module is configured to control the power switch to provide a constant output current by maintaining a constant peak inductor current, even when the input line voltage changes. During a discharging period of the inductor, the CV and CC control module is configured to monitor the sensed output voltage to control the power switch to provide a constant output voltage.

20 Claims, 9 Drawing Sheets

(51) Int. Cl.
*H02M 3/10* (2006.01)
*H02M 7/217* (2006.01)
*H02M 1/08* (2006.01)

(52) U.S. Cl.
CPC ............... *H02M 2001/0009* (2013.01); *H02M 2001/0022* (2013.01)

(56) References Cited

U.S. PATENT DOCUMENTS

| | | | | |
|---|---|---|---|---|
| 2006/0176037 A1* | 8/2006 | Flatness | ................ | H02M 1/32 323/282 |
| 2007/0008745 A1* | 1/2007 | Joshi | ................ | H02M 3/1588 363/21.01 |
| 2008/0259654 A1* | 10/2008 | Huynh | ............. | H02M 3/33523 363/21.16 |
| 2010/0002480 A1* | 1/2010 | Huynh | ................ | H02M 3/335 363/90 |
| 2010/0157636 A1* | 6/2010 | Li | ................ | H02M 3/33515 363/124 |
| 2010/0320973 A1* | 12/2010 | Nishida | ................ | H01M 10/44 320/145 |
| 2010/0321956 A1* | 12/2010 | Yeh | ................ | H02M 3/33507 363/16 |
| 2011/0149612 A1* | 6/2011 | Yeh | ................ | H02M 3/33507 363/21.09 |
| 2011/0175586 A1* | 7/2011 | Kuo | ................ | H02M 3/1563 323/282 |
| 2012/0055455 A1* | 3/2012 | Ruan | ................ | F02P 23/04 123/608 |
| 2012/0274290 A1* | 11/2012 | Ye | ................ | H02M 3/156 323/234 |
| 2012/0287682 A1* | 11/2012 | Zhang | ............... | H02M 3/33507 363/21.16 |
| 2013/0082624 A1* | 4/2013 | Brassfield | .......... | H05B 33/0818 315/297 |
| 2013/0258731 A1* | 10/2013 | Xu | ................ | H02M 1/08 363/78 |
| 2015/0280592 A1* | 10/2015 | Hu | ................ | H02M 3/156 363/21.04 |
| 2016/0020691 A1* | 1/2016 | Yoon | ................ | H05B 33/0815 323/284 |
| 2016/0241068 A1* | 8/2016 | Zhao | ................ | H02J 7/0052 |
| 2016/0261187 A1* | 9/2016 | Deng | ................ | H02M 3/1588 |

* cited by examiner

CONSTANT-VOLTAGE AND CONSTANT-CURRENT BUCK CONVERTER AND CONTROL CIRCUIT

CROSS-REFERENCES TO RELATED APPLICATIONS

This application is a continuation application of U.S. patent application Ser. No. 14/033,341, filed Sep. 20, 2013, which claims priority to Chinese Patent Application No. 201310064413.1, filed on Feb. 28, 2013, both of which are commonly owned and incorporated by reference in their entirety herein.

BACKGROUND OF THE INVENTION

Embodiments of the present invention are directed to power supply control circuits and power supply systems. More particularly, embodiments of the invention provide methods and circuits for constant-voltage and constant-current control of non-isolated buck converter switched mode power supply (SMPS). But it would be recognized that the invention has a much broader range of applicability.

Regulated power supplies are indispensable in modern electronics. For example, the power supply in a personal computer often needs to receive power input from various outlets. Desktop and laptop computers often have regulated power supplies on the motherboard to supply power to the CPU, memories, and periphery circuitry. Regulated power supplies are also used in a wide variety of applications, such as home appliances, automobiles, and portable chargers for mobile electronic devices, etc.

In general, a power supply can be regulated using a linear regulator or a switching mode controller. A linear regulator maintains the desired output voltage by dissipating excess power. In contrast, a switching mode controller rapidly switches a power transistor on and off with a variable duty cycle or variable frequency and provides an average output that is the desired output voltage.

Compared with linear regulators, switching mode power supplies have the advantages of smaller size, higher efficiency and larger output power capability. Pulse Width Modulation (PWM) and Pulse Frequency Modulation (PFM) are two control architectures of switching mode power supplies. Under PWM (pulse width modulation) control, the switching frequency of the power switch is fixed value, but the turn-on time of the power switch is regulated according to the sampled output voltage to ensure that the energy in the inductor is maintained at a constant in order to provide a constant output voltage. Under PFM (Pulse Frequency Modulation) control mode, the control module, based on the sampled value of the output voltage, controls the power switch off-time after the end of the inductor discharge to regulate the next turn-on time of the power switch. In PFM, the on time of the power switch does not vary with the change in load condition.

Switched mode power supply systems can be isolated or non-isolated. In isolated power supplies, a transformer is used to transfer energy between the primary side and the secondary side. In a non-isolated switched mode power supply system, a power switch is connected to an inductor, which is also connected to the output. Magnetic energy is stored in the inductance when the switch is turned on, and the energy is transferred to the output when the switch is turned off. A non-isolated buck converter has the advantage of simple topology and lower cost. But non-isolated converters are often limited in either constant voltage or constant current control, and it is difficult to provide both constant voltage (CV) and constant current (CC) control.

Therefore, there is a need for techniques that can provide both constant voltage (CV) and constant current (CC) control for non-isolated buck converters.

BRIEF SUMMARY OF THE INVENTION

A switch mode power supply is often configured to provide a constant target voltage. However, in a non-isolated buck converter with constant voltage control, the output voltage is often affected by the input line voltage because the output stage usually shares a ground terminal or supply terminal with the input circuit. Embodiments of the present invention provide circuits and methods for ensuring a constant output current even when the input line voltage is changed. In some embodiments, a reference voltage is configured to reflect changes in the input line voltage. When a current sense voltage that represents the current in the inductor reaches that reference voltage, the power switch is turned off. Therefore, even when the input line voltage changes, the peak current of the inductor remains the same, thereby achieving constant current output for the buck converter.

According to some embodiments of the present invention, a control circuit is provided for a buck converter that includes at least an inductor coupled to an output of the buck converter. The control circuit includes a power switch configured for coupling to a line voltage and configured for charging the inductor, an input line voltage sampling circuit, and a constant-voltage (CV) and constant-current (CC) control module coupled to the power switch. The CV and CC control module is configured to:
  during a charging period of the inductor, control the power switch to provide a constant output current by maintaining a constant peak inductor current when the input line voltage changes; and
  during a discharging period of the inductor, to monitor the sensed output voltage to control the power switch to provide a constant output voltage.

In an embodiment of the above control circuit, the CV and CC control module is configured to provide constant output voltage using pulse-width-modulation (PWM) to control the power switch turn-on time based on sampled output voltage.

In another embodiment, the CV and CC control module is configured to provide constant output current using pulse-frequency-modulation (PFM) to control the power switch turn-off time after the discharge of the inductor.

In another embodiment, the CV and CC control module is configured to maintain a triangular charging and discharging inductor current waveform, wherein when the discharge is finished, the power switch is turned on to start charging.

In another embodiment, the CV and CC control module is configured to turn off the power switch when an inductor charging current reaches a peak current reference voltage that reflects changes in the input line voltage.

In another embodiment, the CV and CC control module further comprises an input line voltage compensation circuit that is configured to receive a sampled input line voltage from the input line voltage sampling circuit and a sampled converter output voltage to determine the peak current reference voltage that reflects changes in the input line voltage.

In another embodiment, the input line voltage compensation circuit is configured to determine the peak current reference voltage based on a weighted sum of the sampled input line voltage and the sampled converter output voltage.

In another embodiment, the input line voltage sampling circuit includes a first sampling resistor and a first switch. A first end of the first sampling resistor is connected to a virtual ground terminal through the first switch, the virtual ground terminal being coupled to the line voltage through an intermediate node and the power switch. A second end of the first sampling resistor is connected to an output voltage detecting terminal. The first switch is connected to the CV and CC control module to receive a control signal that also controls the turn-on and turn-off of the power switch.

In another embodiment, a non-isolated buck converter includes the above described control circuit. The bulk converter also includes an inductor coupled to the control circuit and to an output of the buck converter, a rectifying device coupled to the inductor, and a capacitor coupled to the output of the buck converter. The control circuit is configured for coupling to a line voltage. The output of the bulk converter is coupled to the line voltage either at a ground terminal or a power terminal.

According to some embodiments of the present invention, a buck converter switch mode power supply (SMPS) includes input terminals for coupling to an input line voltage, output terminals for coupling to a load device. At least one of the output terminals is coupled to either a ground terminal or a power terminal of the input line voltage. The power supply also includes an inductor coupled to one of the output terminals, a rectifying device coupled to the inductor, a capacitor coupled to the output terminals, and a control circuit. The control circuit includes a power switch configured for coupling to a line voltage and configured for charging the inductor, an input line voltage sampling circuit, and a constant-voltage (CV) and constant-current (CC) control module coupled to the power switch. The CV and CC control module is configured to:

during a charging period of the inductor, control the power switch to provide a constant output current by maintaining a constant peak inductor current when the input line voltage changes; and during a discharging period of the inductor, to monitor the sensed output voltage to control the power switch to provide a constant output voltage.

In another embodiment of the above buck converter SMPS, the CV and CC control module is configured to provide constant output voltage using pulse-width-modulation (PWM) to control the power switch turn-on time based on sampled output voltage.

In another embodiment, the CV and CC control module is configured to provide constant output current using pulse-frequency-modulation (PFM) to control the power switch turn-off time after the discharge of the inductor.

In another embodiment, the CV and CC control module is configured to determine a peak current reference voltage that reflects changes in the input line voltage, and to turn off the power switch when an inductor charging current reaches the peak current reference voltage.

In another embodiment, the input line voltage sampling circuit comprises a first sampling resistor and a first switch. A first end of the first sampling resistor is connected to a virtual ground terminal through the first switch. The virtual ground terminal is coupled to the line voltage through an intermediate node and the power switch. A second end of the first sampling resistor is connected to an output voltage detecting terminal. The first switch is connected to the CV and CC control module to receive a control signal that also controls the turn-on and turn-off of the power switch.

In another embodiment, the control circuit also includes an output terminal coupled to the power switch and configured for coupling to the inductor through a first resistor.

In another embodiment, the control circuit also includes a virtual ground terminal configured for coupling to the inductor and the first resistor.

In another embodiment, the control circuit also includes an input terminal for receiving the sensed output voltage through a voltage divider coupled to the output of the buck converter, the voltage divider including a second resistor and a third resistor.

In another embodiment, the second resistor and the third resistor are included in a single integrated circuit (IC) chip as the control circuit.

In another embodiment, the buck converter also includes diode coupled between an output terminal of the converter and the second resistor.

In another embodiment, the control circuit also includes a power terminal (VCC) for receiving operating power, said power terminal is coupled to a center tap point of the inductor for reducing the voltage at the VCC terminal.

A further understanding of the nature and advantages of the present invention may be realized by reference to the remaining portions of the specification and the drawings.

DETAILED DESCRIPTION OF THE INVENTION

Embodiments of the present invention provide techniques related to operation of a switched mode power supply. More particularly, the present invention provides a method and system for constant voltage (CV) and constant-current (CC) control of a buck converter power supply. Merely by way of example, the present invention has been applied to a buck converter of a non-isolated type, but it would be recognized that the invention has a much broader range of applications.

The description below is presented with reference to a series of drawing figures enumerated above. These diagrams are merely examples, and should not unduly limit the scope of the claims herein. In connection with the various aspects illustrated and described, one of ordinary skill in the art would recognize other variations, modifications, and alternatives.

Figure 1:
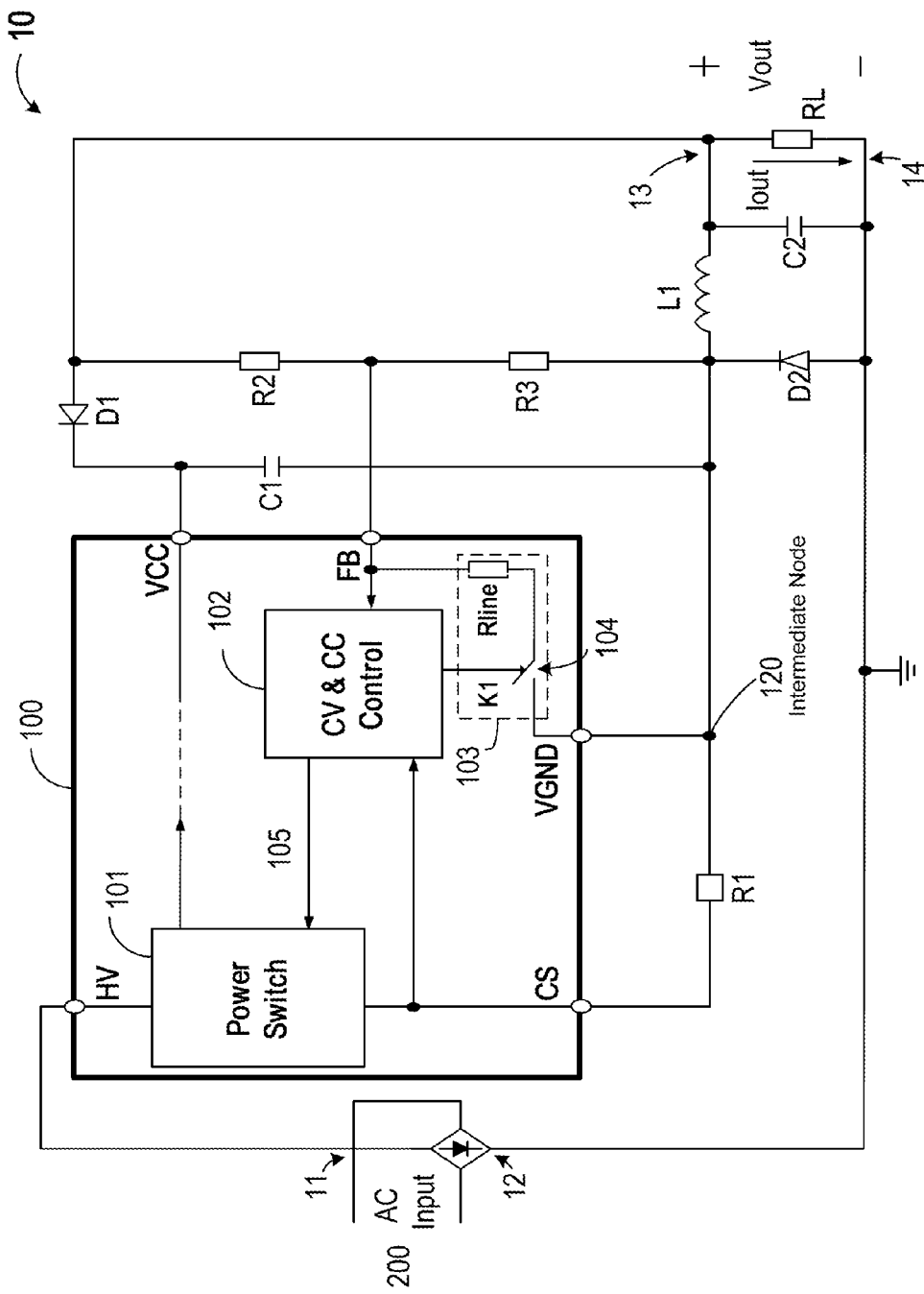
FIG. 1 is a simplified circuit/block diagram illustrating a switch-mode power supply including a buck converter according to an embodiment of the present invention.

FIG. 1 is a simplified circuit/block diagram illustrating a switch-mode power supply including a buck converter according to an embodiment of the present invention. As shown in FIG. 1, a buck converter switch mode power supply 10 includes input terminals 11 and 12 for coupling to a line voltage 200 labeled AC Input and output terminals 13 and 14 for coupling to a load device RL. In FIG. 1, AC input voltage is rectified to provide a DC input voltage to input terminals 11 and 12. The embodiment shown in FIG. 1 is an example of non-isolated power supply, in which the buck converter has at least one of the output terminals coupled to either a ground terminal or a power terminal of the input line voltage. In the example of FIG. 1, output terminal 14 is connected to input terminal 12, which is a ground terminal of the input line voltage. In FIG. 1, buck converter 10 also includes an inductor L1 coupled to output terminal 13, a rectifying device D2 coupled to inductor L1, and a capacitor C2 coupled to output terminals 13 and 14.

As shown in FIG. 1, buck converter 10 also includes a control circuit 100, which includes a power switch 101 configured for coupling to the line voltage and configured for charging inductor L1. Control circuit 100 also includes a constant-voltage (CV) and constant-current (CC) control module 102 coupled to power switch 101. CV and CC control module 102 is configured for sensing an output voltage of the buck converter at a terminal FB of control circuit 100. Control module 102 is also configured for sensing a current through inductor L1 at a terminal CS of control circuit 100. In an embodiment shown in FIG. 1, terminal CS is connected to inductor L1 through a sampling resistor R1. Terminal CS is also used as an output terminal for control module 102 for charging inductor L1. Control circuit 100 further includes a virtual ground terminal VGND, which is an electrical ground terminal for control circuit 100 and is configured for coupling to inductor L1 and resistor R1 through an intermediate node 120. Intermediate node 120 is coupled to the line voltage through the CS terminal and the power switch. Terminal FB of control circuit 100 is connected to inductor L1 through a voltage divider formed by sampling resistors R2 and R3. Control circuit 100 also has an HV terminal connected to the input voltage and a VCC terminal for receiving a power supply for the operation of the control circuit.

Further, control module 102, according to the sensed voltage and current, is configured for providing a control signal 105 turning on and off power switch 101 in order to maintain a constant output current Tout and a constant output voltage Vout. In some embodiments, during a charging period of the inductor, CV and CC control module 102 is configured to monitor a peak inductor current to control power switch 101 to maintain the constant output current. During a discharging period of the inductor, CV and CC control module 102 is configured to monitor the sensed output voltage to control power switch 101 to maintain the constant output voltage.

As described above, the embodiment shown in FIG. 1 is a non-isolated power supply, in which the buck converter has at least one of the output terminals coupled to either a ground terminal or a power terminal of the input line voltage. Non-isolated power supplies have simpler topologies and tend to be less costly than isolated power supplies utilizing, e.g., a transformer. They are often used in applications in which isolation is not critical, for example, in LED lamps, which have outer isolation, or washing machines. Conventional non-isolated power supplies tend to have either only constant-current (CC) control or constant-voltage (CV) control, but not both CV and CC. The non-isolated power supplies also tend to be susceptible to line voltage changes. Therefore, it is more difficult to have both CV and CC controls in non-isolated power supplies.

In embodiments of the invention, control circuit 100 is configured to provide both constant-voltage (CV) and constant-current (CC) control in the non-isolated power supply. Depending on the control signals issued by control circuit 100, the power switch is controlled in the following two ways. Under PWM (pulse width modulation) control, the switching frequency of the power switch is fixed value, but the turn-on time of the power switch is regulated according to the sampled output voltage to ensure that the energy in the inductor is maintained at a constant in order to provide a constant output voltage. Under PFM (Pulse Frequency Modulation) control mode, the control module, based on the sampled value of the output voltage, controls the power switch off-time after the end of the inductor discharge to regulate the next turn-on time of the power switch. In PFM, the on time of the power switch does not vary with the change in load condition. Thus, the energy in the inductor is maintained at a constant in order to provide a constant output voltage. In some embodiments, the control circuit is also configured to control the conduction of the power switch following the discharge of the inductor to maintain a triangular discharge current waveform.

In embodiments of the invention, the buck converter is also configured to provide constant output current. When the inductor is charging, the controller ensures the peak current in the inductor does not vary with the input line voltage by controlling the on and off of the power switch based on the sampled input voltage and the inductor current. To achieve constant current, the controller is configured to maintain a triangular charging and discharging inductor current waveform. Thus, when the discharge is finished, the power switch is turned on to start charging.

Figure 2:
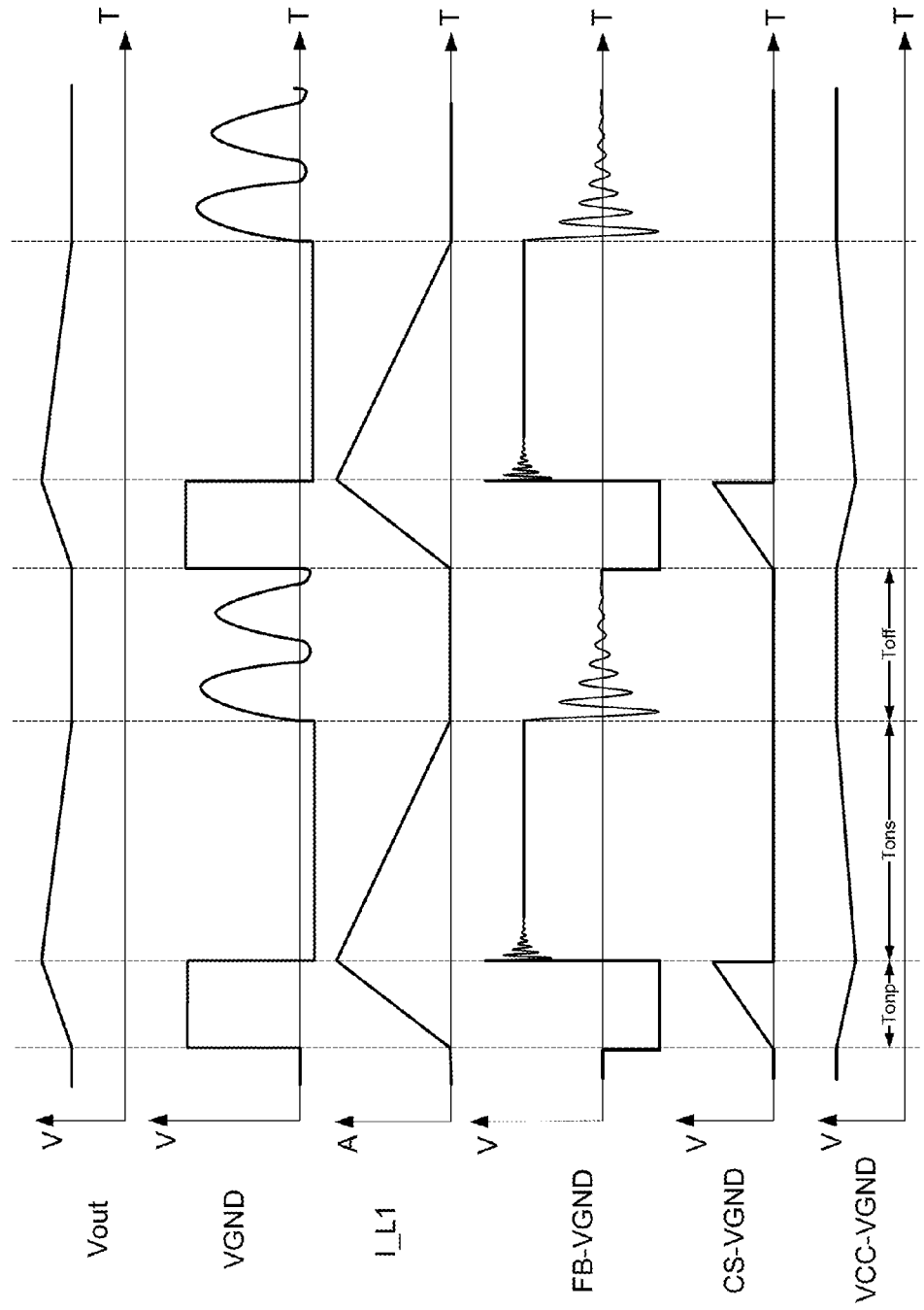
FIG. 2 shows the waveforms of various signals in in a buck converter according to an embodiment of the present invention.

FIG. 2 illustrates the waveforms of various signals in in a buck converter power supply according to an embodiment of the present invention. In FIG. 2, Vout is the output voltage of buck converter power supply 10, VGND is the voltage at VGND the virtual ground terminal of control circuit 100, FB-VGND is the voltage between output voltage feedback terminal FB and VGND, CS-VGND is the voltage between inductor current sense terminal CS and VGND, and VCC-VGND is the voltage between the control circuit power supply terminal VCC and VGND. Along the time axis shown at the bottom, Tonp denotes the time when the inductor is charging, Tons denotes the time when the inductor is discharging (when the power switch is off), and Toff denotes the time when inductor current I_L1 is zero, during which time the inductor discharge is finished and the power switch is still off. With reference to FIGS. 1 and 2, the operation of the buck converter is explained in further details below.

During Tonp, when the power switch is on, VGND and HV are essentially at the same voltage, as VGND is coupled to HV through intermediate node 120, the CS terminal, and the power switch. The voltage at VGND is higher than the voltage at Vout. Inductor L1 is storing energy. Current I_L1 is rising linearly and capacitor C2 provides power to load RL. During this time, diode D1 is off, capacitor C1 is discharging and provides power to the VCC terminal of control circuit 100. As a result, VCC-VGND drops. During this period, the ground of the AC input voltage is at absolute 0V, but the VGND terminal of control circuit 100 is floating and can vary between a negative voltage and a high voltage. As a result, when the power switch is on, VGND is at a high voltage, and Vout is lower. Note that the voltage between Vout and VGND is divided by the voltage divider formed by R2 and the small resistor Rline in line voltage sampling circuit 103. Therefore, FB-VGND in FIG. 2 is a smaller negative voltage, which is proportional to the input line voltage.

During Tons, when the power switch is off, the control circuit monitors the input voltage sampled at the CS terminal, and turns off the power switch when the peak current in the inductor has reached a preset value. As a result, inductor L1, capacitor C2, and diode D2 form a discharging circuit, causing current I_L1 in inductor L1 to drop linearly. At this time, the voltage at VGND is negative, and its magnitude is essentially the forward voltage drop of diode D2. During this time, Vout is higher than VCC, and capacitor C2 charges capacitor C1 through D1. The FB terminal senses output voltage Vout through voltage divider formed by R2 and R3. The control circuit monitors the voltage at the FB terminal and calculates the time Toff. In some embodiments, after a time delay following the end of discharge, the power switch is turned on again to effect constant current control. In a specific embodiment, this delay time is selected to be ¼ of resonance period.

During time Toff, inductor L1 finishes discharging. The voltage at VGND undergoes damped oscillation due to parasitic components in the circuit. The operation during this period can be expressed by equation 1.

$$I_o = \frac{1}{2V_{Out}} L \cdot I_{pk}^2 \cdot \frac{1}{T_{onp} + T_{ons} + T_{off}} \cdot \eta \quad (1)$$

In equation 1, Vout is the output voltage of the buck converter, Io is the output current of the converter, L is the inductance of inductor L1, Ipk is the peak current in inductor L1, Tonp is inductor charging time, Tons is inductor discharging time, Toff is the time during which inductor current is zero, and η is system conversion efficiency.

Figure 3:
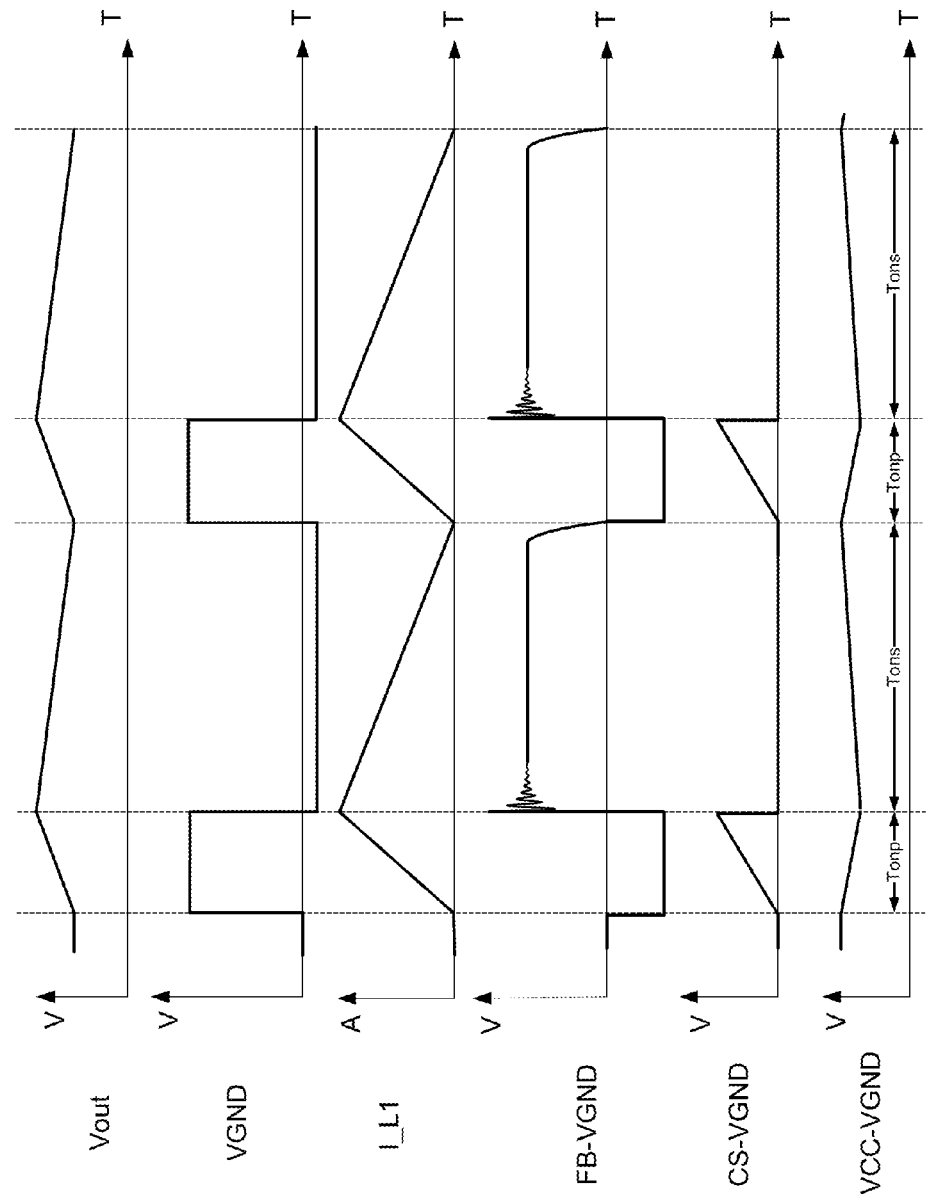
FIG. 3 is a waveform diagram illustrating various signals in a buck convers according to another embodiment of the present invention.

FIG. 3 is a waveform diagram illustrating various signals in a buck converter according to another embodiment of the present invention. In an embodiment, the constant voltage and constant current (CV and CC) control module 102 is configured in pulse frequency modulation (PFM) control. FIG. 3 illustrates waveforms in the converter during constant current control. By comparing FIG. 3 with FIG. 2, it can be seen that the waveforms in FIG. 3 are similar to those in FIG. 2, with the exception that the Toff period, when the inductor current is zero, is absent in FIG. 3.

In embodiments of the present invention, CV and CC control module 102 is configured to control the on and off of power switch 101. During constant output voltage control (CV), during Tons when inductor L1 is discharging, the output current is sampled at terminal FB through divider R2 and R3. Based on the sampled values of the output voltage, the control circuit controls the off time of power switch tube 101 after the end of the discharge inductor L1, so that output of the buck circuit 10 maintains a constant voltage.

During constant output current control (CC), when the sampled output voltage at terminal FB indicates inductor L1 has finished discharging, the control circuit turns on power switch 101. When power switch is on and inductor L1 is charging, a voltage Vfb is detected at terminal FB. A reference voltage Vth is calculated based on Vfb. When the inductor charging current at terminal CS, represented by Vcs, reaches reference voltage Vth, power switch 101 is turned off.

In conventional converters, the inductor current is compared to a fixed reference voltage in order to maintain a constant peak current. As described in more detail in connection with FIG. 4, there is a time delay associated with the power switch turn-off. When the input line voltage changes, the peak current in the inductor often does not stay constant.

Figure 4:
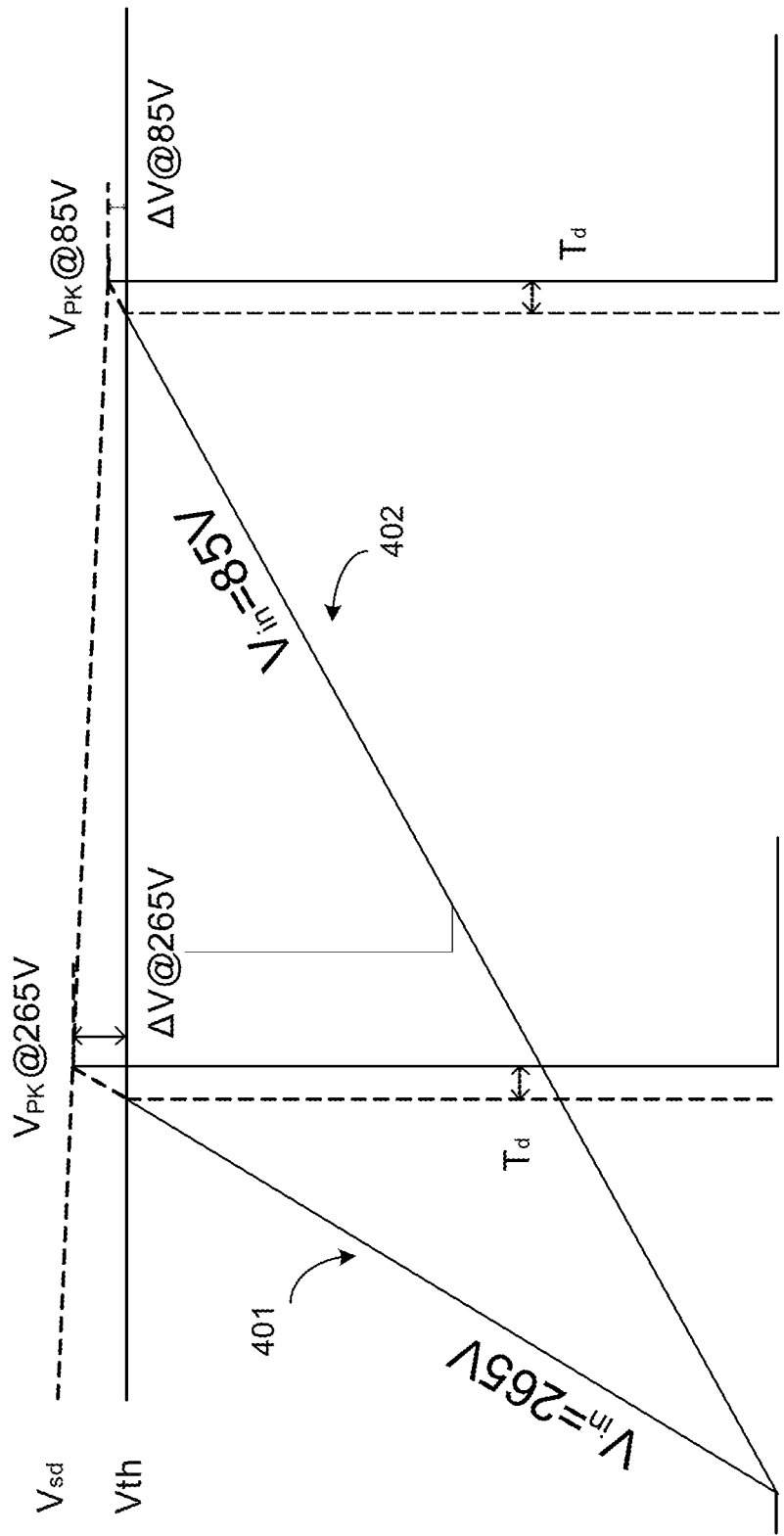
FIG. 4 is a diagram illustrating the impact of varying input voltage on the power supply.

FIG. 4 is a diagram illustrating the impact of varying input voltage on the power supply. In FIGS. 4, 401 and 402 represent Vcs rising with time for input line voltages of 265 V and 85 V, respectively. It can be seen that when the input voltage of the buck type switching power supply changes, the slope of the inductor L1 charging current is not the same. Vth is a fixed reference voltage for controlling the peak current. Td represents a time delay it takes for the power switch to turn off after the turn-off control signal is issued. Vsd represents the effective reference voltage for turning off the power switch. It can be seen in FIG. 4 that Vsd varies with input line voltage as a result of different charging current during the time delay Td. Thus, the peak current is higher when the input line voltage is higher, resulting in a higher output current. This is one of the reasons why conventional non-isolated power supplies cannot provide both constant voltage (CV) and constant current (CV) at the output at the same time.

According to embodiments of the present invention, the input line voltage is sampled, and a reference voltage is determined to reflect the variations of the input line voltage. In a specific embodiment, when the input line voltage is higher, the reference voltage is made lower. When the inductor is charging, a current sense voltage is compared to the reference voltage. When the current sense voltage reaches the reference voltage, the power switch is turned off. The reference voltage reflects the variations in the input line voltage, enabling the peak current to be maintained at a constant despite the variation in the input line voltage.

Figure 5:
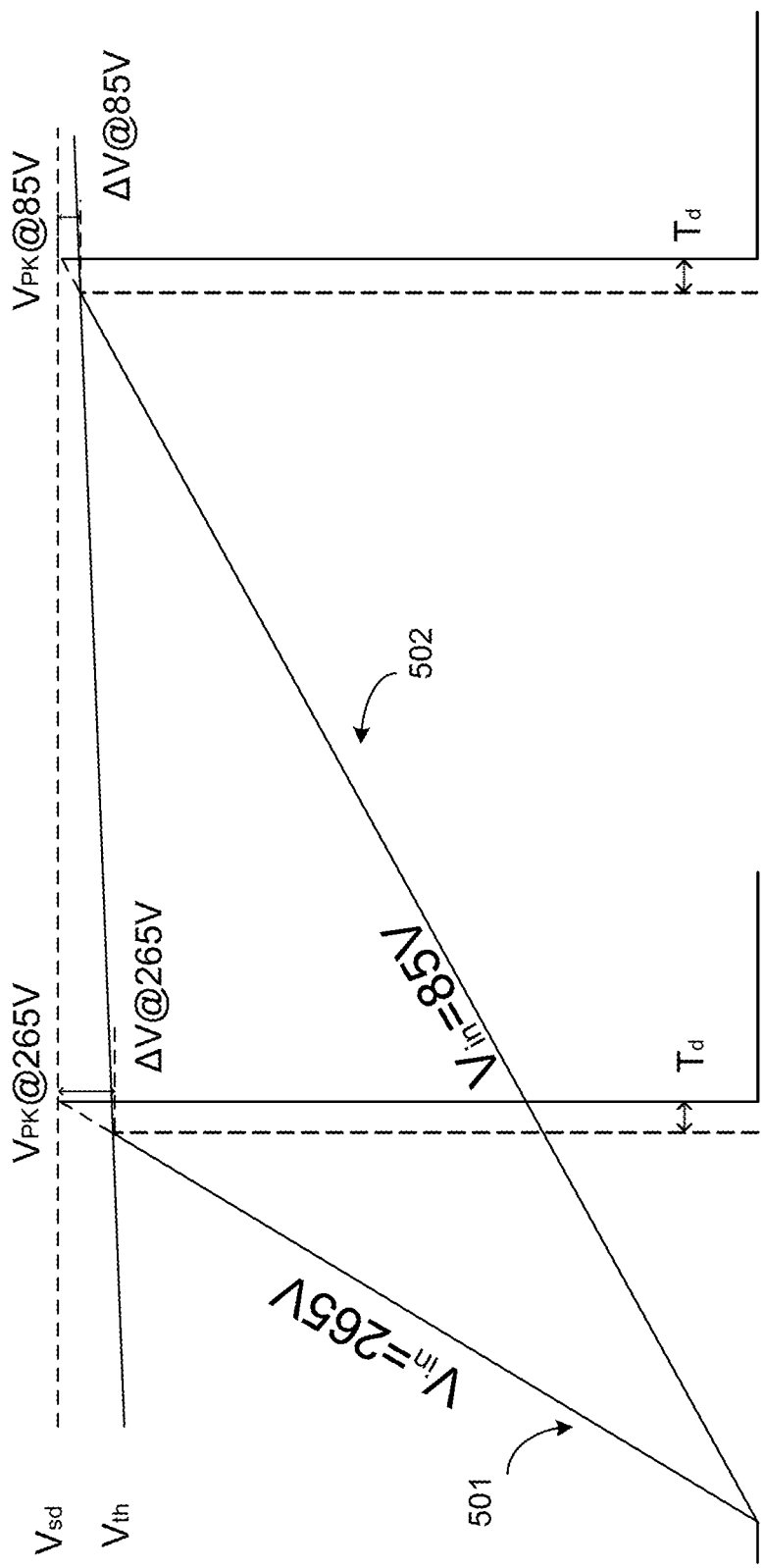
FIG. 5 is a diagram illustrating compensating for varying input voltage according to an embodiment of the present invention.

FIG. 5 is a diagram illustrating peak current at different input voltages on the power supply according to an embodiment of the present invention. In FIGS. 5, 501 and 502 represent Vcs rising with time for input line voltages of 265 V and 85 V, respectively. Td represents a time delay it takes for the power switch to turn off after the turn-off control signal is issued. Vsd represents the effective reference voltage for turning off the power switch. Vth is the reference voltage for controlling the peak current, and is now allowed to vary with different input line voltage. It can be seen in FIG. 5 that Vsd now does not vary with input line voltage. Thus, the peak current is maintained at a constant despite the variation in the input line voltage.

In order to provide constant voltage and constant current control, embodiments of the invention include line voltage sampling and compensation, as described below.

As shown in FIG. 1, control circuit 100 includes a line voltage sampling circuit 103, that is configured to monitor the variations of the line voltage. In the embodiment shown in FIG. 1, line voltage sampling circuit 103 is configured to produce a control signal K1 to control a switch device 104 in order to maintain a constant peak inductor current. Line voltage sampling circuit 103 is configured to enable the buck converter to maintain constant current even when the input line voltage changes. As shown in FIG. 1, in conjunction with the line voltage monitoring function of control module

100, line voltage sampling circuit 103 also includes a fourth resistor Rline configured for coupling to the second resistor R2 and switch device 104 coupled to resistor Rline. Switch device 104 is controlled by control signal K1 produced by control module 102.

One end of first sampling resistor Rline is connected to terminal FB, and the other end is connected to VGND terminal through control switch 104. When switch 104 is open, the VGND terminal is left unconnected. Control signal K1 is provided by CV and CC control module 102, which also provides control signal 105 to control the on/off of power switch 101. In some embodiments, control signal K1 is the same as control signal 105. In other words, when the power switch is turned on by control signal 105, switch 104 is also turned on by control signal K1. When power switch 101 is off, switch 104 is also off. In some embodiments, control signal K1 and control signal 105 can be provided by the same terminal of CV and CC control module 102.

In some embodiments, when power switch 101 is turned on, the on resistance is negligible, therefore, the voltage at CS is approximately equal to the input AC line voltage. Also, because the smaller value sampling resistor R1 is connected between the CS terminal and the VGND terminal through intermediate node 120, the voltage of VGND tracks the input line voltage and is slightly smaller than the voltage of the AC input voltage. The FB terminal samples the output voltage of the buck converter, which is generally a lower voltage, e.g., about tens of volts. Therefore, the voltage between the FB terminal and VGND is negative, i.e., $V_{FB}$-$V_{VGND}$ is negative.

In FIG. 1, first sampling resistor Rline generally has a low resistance, e.g., about 200Ω. In contrast, the resistance of R2 and R3 is generally in the tens of KΩ. When power switch 101 is turned on, first control switch 104 is closed. The voltage at terminal FB is the output voltage Vout sampled through the R2 and Rline divider, usually a smaller negative voltage, e.g., between about 50 mV to about 400 mV. Therefore, the first sampling resistor Rline reduces the voltage drop of at the FB terminal. Thus, Rline forms a voltage divider with R2 for sensing the input line voltage for the constant voltage and constant current control, when switch 104 is closed.

Figure 6:
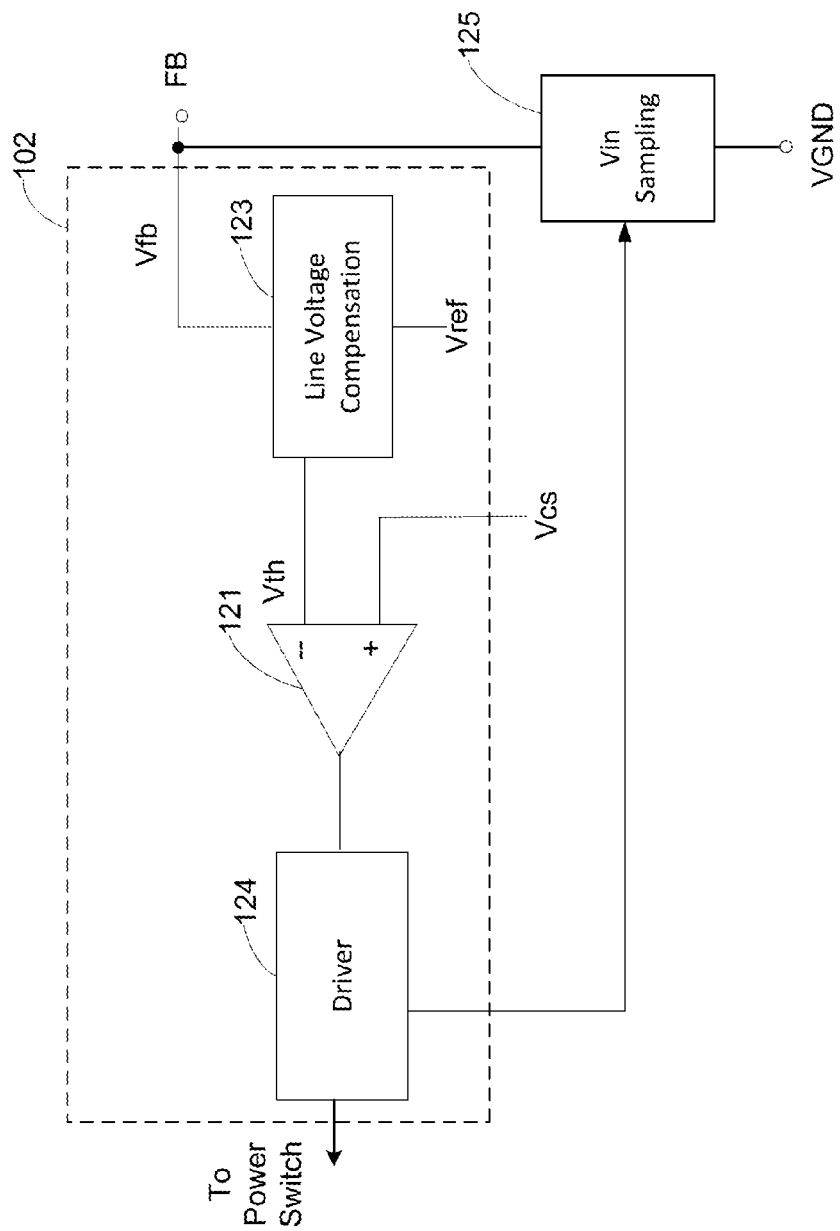
FIG. 6 is a simplified block diagram illustrating part of the power supply of FIG. 1 including line voltage compensation.

FIG. 6 is a simplified block diagram illustrating part of CV & CC control module 102 for the power supply of FIG. 1 including line voltage compensation according to embodiments of the invention. As shown in FIG. 6, part of CV & CC control module 102 includes a comparator 121, an input line voltage compensation circuit 123, a power switch driver circuit 124, and an input voltage sampling circuit 125. A first input terminal of input voltage compensation circuit 123 is coupled to a reference voltage Vref, and a second input terminal is coupled to Vfb from the output voltage detecting terminal FB. Input line voltage compensation circuit 123 provides an output threshold voltage Vth, which is a function of Vref and Vfb and reflects the variation in the input line voltage. In some embodiments, Vth is a weighted sum of Vref and Vfb. Comparator 121 is configured to compare Vcs with Vth. Comparator 121 receives Vcs from the inductive charging current detecting terminal CS, the charging current detecting termination of said inductor (inductance L1 corresponding to the charging current detected the inductor voltage, i.e. charging current detecting terminal voltage Vcs). When Vcs reaches the reference voltage Vth, comparator 121 outputs a control signal, which is used by driver 124 to turn off the power switch.

A terminal of voltage sampling circuit 125 is connected to Vfb from output voltage detecting terminal FB, and another terminal is connected to the VGND terminal. Voltage sampling circuit 125 also receives a control signal from the output terminal of the power switch drive circuit 124.

An example of input sampling circuit 125 is shown in FIG. 1 as circuit 103. As shown in FIG. 1, circuit 103 includes sampling resistor Rline and switch 104 controlled by control signal K1. Sampling circuit 103 also allows lower voltage requirement at terminal FB. The operation of input line voltage compensation in CV and CC controller 102 and the line voltage sampling circuit 103 can be explained in more detail below with reference to the waveform diagrams in FIGS. 2 and 3.

In FIG. 2, three time periods are identified, Tonp, Tons, and Toff. During time period Tonp, the power switch is on, and the VGND terminal is at a high voltage, basically the same as line voltage HV. The voltage at VGND is higher than Vout. As a result, the inductor current rises and charges output terminal Vout. During this time, the path including Rline is turned on by the K1 signal (i.e., Rline is connected to VGND), and the voltage drop between VGND and Vout is divided by the voltage divider formed by Rline and R2, resulting in FB-VGND being a smaller negative voltage, which is proportional to the line voltage. As shown in FIG. 6, the sampled Vfb is used by line voltage compensation circuit 123 to provide a reference voltage Vth, which reflects changes in the input line voltage and enables constant current control. Further, the current through resistor R1 is equal to the current through L1, and this current is sensed as a voltage at the CS terminal. The controller is configured to use the CS terminal to control the peak current through L1. When the power switch is on, the current through diode D1 is off, the stored energy at capacitor C1 supplies power to the controller chip, and voltage VCC-VGND decreases.

When the controller senses that the peak inductor current L1 has reached a pre-set value through the CS terminal, the power switch is turned off, and starts time period Tons. During Tons, inductor L1, capacitor C2, diode D2 form a discharge circuit, causing the capacitor current to drop linearly. At this point, the voltage at VGND is negative, and its magnitude is basically equal to the positive conduction voltage drop of D2. During this period, the path including Rline is turned off by the K1 signal (i.e., Rline is disconnected from VGND), and the output voltage Vout is sampled at the FB terminal through the voltage divider formed by R2 and R3. The controller is configured to use the information at terminal FB to control the output. During this time, Vout is higher than VCC, and capacitor C2 charges capacitor C1 through diode D1.

After the completion of L1 current discharging through C2 and D2, the voltage at terminal VGND can exhibit damped oscillation caused by parasitic components in the circuit. The controller is configured to determine a time period Toff based on various parameters in the circuit.

As described above, embodiments of the present invention provide constant current control by using a reference voltage Vth that reflects the changes in the input line voltage to maintain the peak inductor current.

Figure 7:
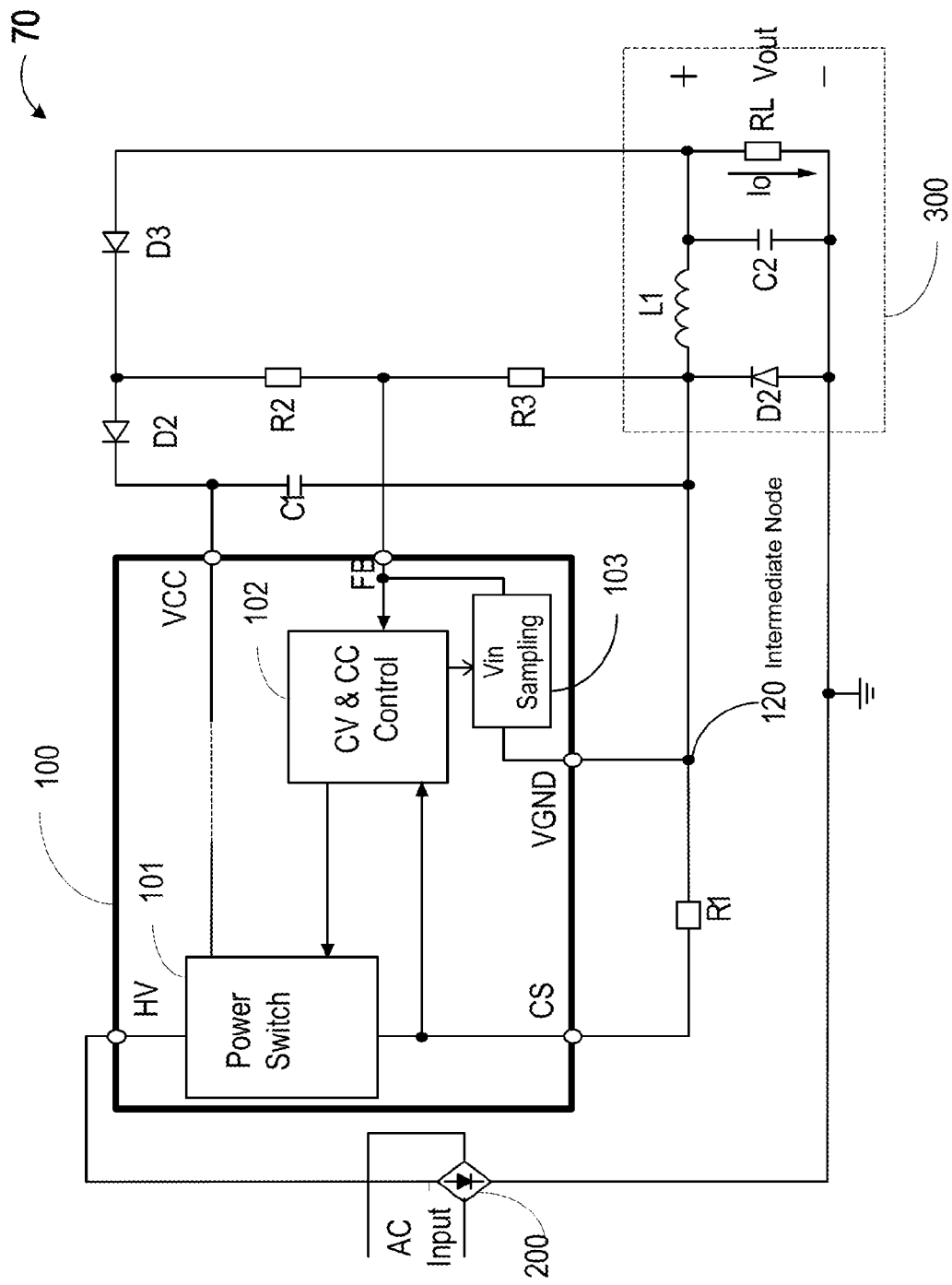
FIG. 7 is a simplified circuit/block diagram illustrating a switch-mode power supply including a buck converter according to another embodiment of the present invention.

FIG. 7 is a simplified circuit diagram illustrating a buck type switch-mode power supply 70 according to another embodiment of the present invention. As shown in FIG. 7, buck type switch-mode power supply 70 is similar to power supply 10 in FIG. 1, and includes a control circuit 100 and output circuit 300. A difference is that power supply 70 includes a diode D3 for reducing the voltage at terminal FB. As shown, diode D3 is connected between the output terminal and diode D2. As described in connection with FIG. 1, the VGND terminal of control circuit 100 is floating and is not at absolute 0 V. When the power switch is turned on, the voltage at VGND is almost the same as input AC voltage 200, causing a large voltage to appear at terminal FB, which is connected to VGND through resistor R3. The high voltage requirement at FB can increase the complexity and cost of control circuit 100. As shown in FIG. 7, with diode D3 sustaining most of the voltage drop, the voltage at terminal FB is lowered. Thus, the voltage handling requirement of the FB terminal is reduced, allowing the control circuit to be implement in a low-voltage integrated circuit (IC) chip.

Figure 8:
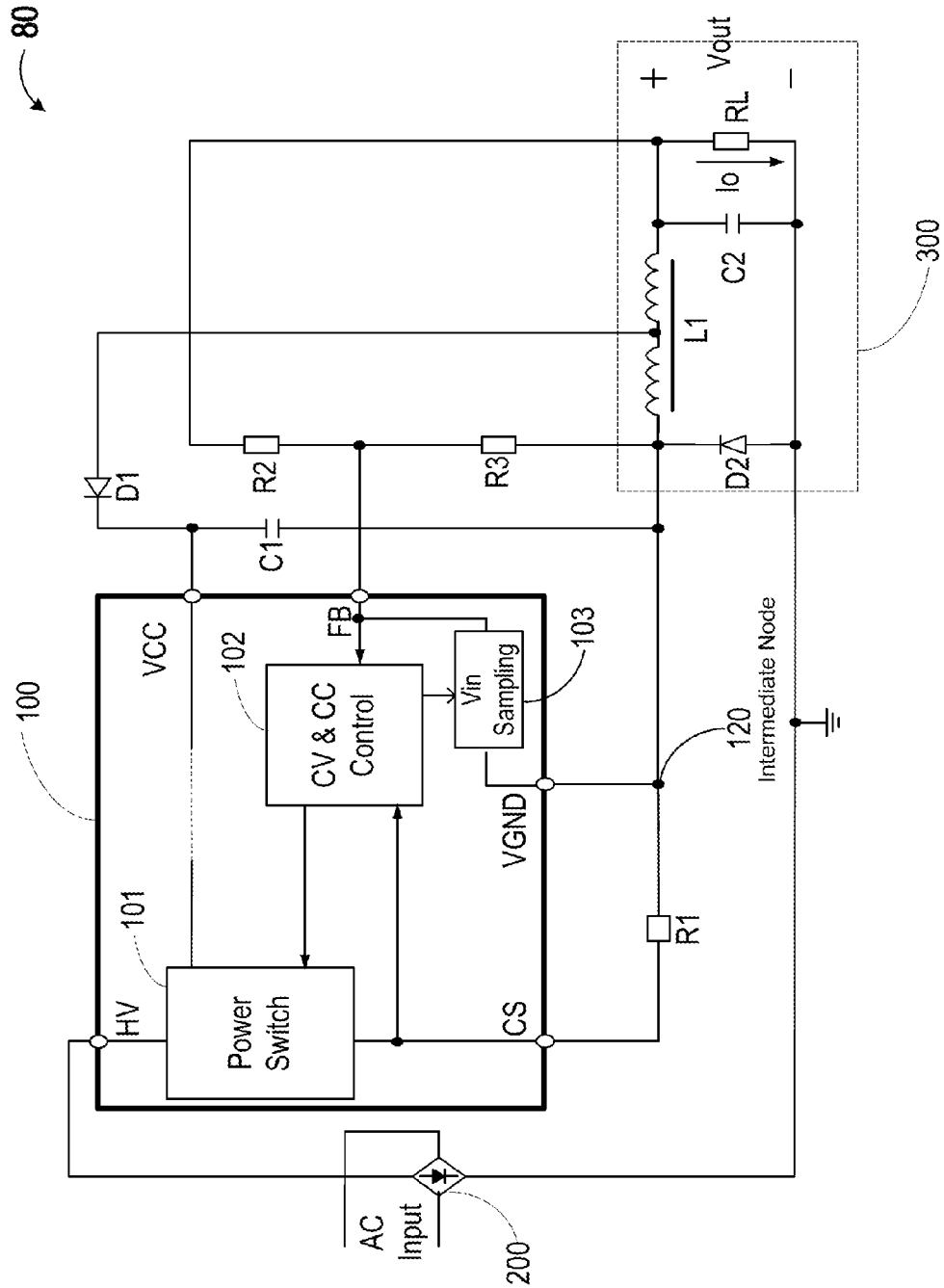
FIG. 8 is a simplified circuit/block diagram illustrating a switch-mode power supply including a buck converter according to another embodiment of the present invention.

FIG. 8 is a simplified circuit diagram illustrating a buck type switch-mode power supply according to another embodiment of the present invention. As shown in FIG. 8, buck type switch-mode power supply 80 is similar to power supply 10 in FIG. 1, and includes a control circuit 100 and output circuit 300. A difference is that power supply 80 includes a center-tapped inductor L1 for reducing the voltage at terminal VCC of control circuit 100. As shown in FIG. 8, one terminal of inductor L1 is connected to diode D1, and the other terminal of L1 is connected to output capacitor C2. A center-tap terminal of L1 is connected to diode D2, which in turn is connected to the VCC terminal of control circuit 100. As a result, the VCC terminal receives only a portion of the voltage drop across inductor L1. Thus, the voltage handling requirement of the VCC terminal is reduced, allowing the control circuit to be implement in a low-voltage integrated circuit (IC) chip.

Figure 9:
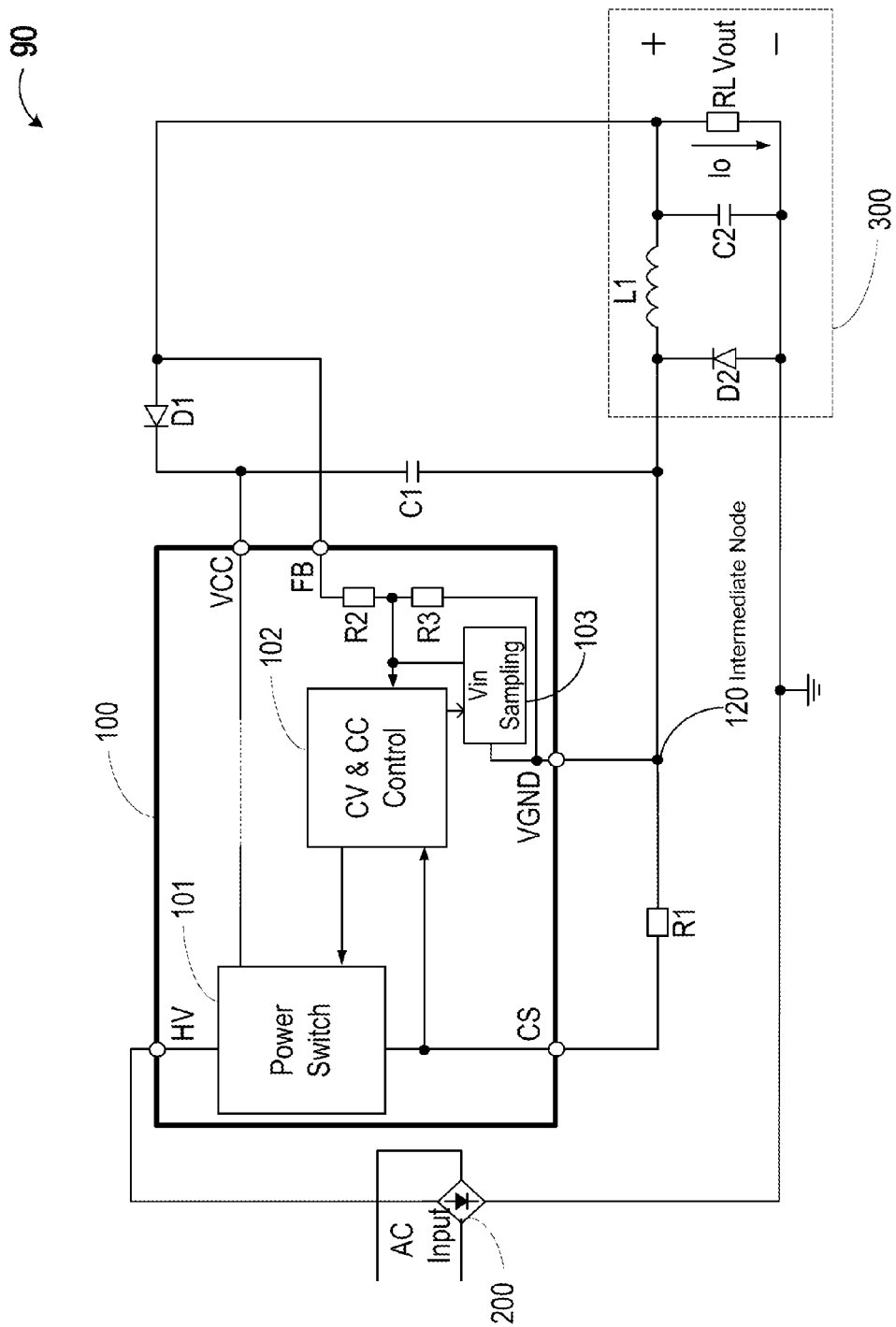
FIG. 9 is a simplified circuit/block diagram illustrating a switch-mode power supply including a buck converter according to yet another embodiment of the present invention.

FIG. 9 is a simplified circuit diagram illustrating a switch-mode power supply including a buck converter according to yet another embodiment of the present invention. As shown in FIG. 9, buck type switch-mode power supply 90 is similar to power supply 10 in FIG. 1, and includes a control circuit 100 and output circuit 300. A difference is that sampling resistors R2 and R3 are integrated in control circuit 100. As shown, R1 and R2 are connected in series between the FB terminal and the VGND terminal of control circuit 100, and a node between R1 and R2 is connected to and input of CV and CC module 102 for sampling the output voltage. By integrating R2 and R3 into control circuit 100, the outside circuitry is simplified and the reliability of the control circuit is improved.

Various aspects of the invention are described above using specific examples. However, it is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A control circuit for a buck converter, the buck converter including at least an inductor coupled to an output of the buck converter, the control circuit comprises: a power switch configured for coupling to a line voltage and configured for charging the inductor; an input line voltage sampling circuit configured to provide a sampled input line voltage; and a constant-voltage (CV) and constant-current (CC) control module coupled to the power switch, wherein the CV and CC control module is configured to: during a charging period of the inductor, enable the input line voltage sampling circuit to provide the sampled input line voltage; modify a threshold voltage for controlling a peak inductor current based on the sampled input line voltage; and control the power switch to provide a constant output current by maintaining a constant peak inductor current in response to the sampled input line voltage; and during a discharging period of the inductor, to monitor the sensed output voltage to control the power switch to provide a constant output voltage.

2. The circuit of claim 1, wherein the CV and CC control module is configured to provide constant output voltage using pulse-width-modulation (PWM) to control the power switch turn-on time based on sampled output voltage.

3. The circuit of claim 1, wherein the CV and CC control module is configured to provide constant output current using pulse-frequency-modulation (PFM) to control the power switch turn-off time after the discharge of the inductor.

4. The circuit of claim 1, wherein the CV and CC control module is configured to maintain a triangular charging and discharging inductor current waveform, wherein when the discharge is finished, the power switch is turned on to start charging.

5. The circuit of claim 1, wherein the CV and CC control module is configured to turn off the power switch when an inductor charging current reaches a peak current reference voltage that reflects changes in the input line voltage.

6. The circuit of claim 5, wherein the CV and CC control module further comprises an input line voltage compensation circuit that is configured to receive the sampled input line voltage from the input line voltage sampling circuit and a sampled converter output voltage to determine the peak current reference voltage that reflects changes in the input line voltage.

7. The circuit of claim 6, wherein the input line voltage compensation circuit is configured to determine the peak current reference voltage based on a weighted sum of the sampled input line voltage and the sampled converter output voltage.

8. The circuit of claim 1, wherein the input line voltage sampling circuit comprises a first sampling resistor and a first switch, wherein:
a first end of the first sampling resistor is connected to a ground terminal through the first switch, the first switch is connected to the CV and CC control module to receive a control signal that also controls the turn-on and turn-off of the power switch; and
a second end of the first sampling resistor is connected to an output voltage detecting terminal.

9. A non-isolated buck converter comprising the control circuit of claim 1, the bulk converter further comprising:
an inductor coupled to the control circuit and to an output of the buck converter without using a transformer;
a rectifying device coupled to the inductor; and
a capacitor coupled to the output of the buck converter;
wherein the control circuit is configured for coupling to a line voltage;
wherein the output of the bulk converter is coupled to the line voltage either at a ground terminal or a power terminal.

10. A buck converter switch mode power supply (SMPS), comprising:
input terminals for coupling to an input line voltage;
output terminals for coupling to a load device, wherein at least one of the output terminals is coupled to either a ground terminal or a power terminal of the input line voltage;
an inductor coupled to one of the output terminals;
a rectifying device coupled to the inductor;
a capacitor coupled to the output terminals; and
a control circuit including:
a power switch configured for coupling to a line voltage and configured for charging the inductor;

an input line voltage sampling circuit configured to provide a sampled input line voltage; and a constant-voltage (CV) and constant-current (CC) control module coupled to the power switch, wherein the CV and CC control module is configured to:

during a charging period of the inductor, control the power switch to provide a constant output current by maintaining a constant peak inductor current by:
receiving the sampled input line voltage from the input line voltage sampling circuit; and
modifying a threshold voltage based on the sampled input line voltage; and during a discharging period of the inductor, to monitor the sensed output voltage to control the power switch to provide a constant output voltage.

11. The buck converter of claim 10, wherein the CV and CC control module is configured to provide constant output voltage using pulse-width-modulation (PWM) to control the power switch turn-on time based on sampled output voltage.

12. The buck converter of claim 10, wherein the CV and CC control module is configured to provide constant output current using pulse-frequency-modulation (PFM) to control the power switch turn-off time after the discharge of the inductor.

13. The buck converter of claim 10, wherein the CV and CC control module is configured to determine a peak current reference voltage that reflects changes in the input line voltage, and to turn off the power switch when an inductor charging current reaches the peak current reference voltage.

14. The buck converter of claim 10, wherein the input line voltage sampling circuit comprises a first sampling resistor and a first switch, wherein:

a first end of the first sampling resistor is connected to a virtual ground terminal through the first switch, the first switch is connected to the CV and CC control module to receive a control signal that also controls the turn-on and turn-off of the power switch; and a second end of the first sampling resistor is connected to an output voltage detecting terminal.

15. The buck converter of claim 10, wherein the control circuit further comprises an output terminal coupled to the power switch and configured for coupling to the inductor through a first resistor.

16. The buck converter of claim 15, wherein the control circuit further comprises a ground terminal configured for coupling to the inductor and the first resistor.

17. The buck converter of claim 10, wherein the control circuit further comprises an input terminal for receiving the sensed output voltage through a voltage divider coupled to the output of the buck converter, the voltage divider including a second resistor and a third resistor.

18. The buck converter of claim 17, wherein the second resistor and the third resistor are included in a single integrated circuit (IC) chip as the control circuit.

19. The buck converter of claim 17, further comprising diode coupled between an output terminal of the converter and the second resistor.

20. The buck converter of claim 10, wherein the control circuit further comprises a power terminal (VCC) for receiving operating power, said power terminal is coupled to a center tap point of the inductor for reducing the voltage at the VCC terminal.

* * * * *